United States Patent [19]

Yan

[11] Patent Number: 5,110,480

[45] Date of Patent: May 5, 1992

[54] ON-LINE REJUVENATION OF SPENT ABSORBENTS

[75] Inventor: Tsoung Y. Yan, Philadelphia, Pa.

[73] Assignee: Mobil Oil Corporation, Fairfax, Va.

[21] Appl. No.: 548,324

[22] Filed: Jul. 5, 1990

[51] Int. Cl.⁵ .............................................. B01D 15/00
[52] U.S. Cl. ...................................... 210/670; 55/74;
208/253; 208/305; 210/679; 210/688; 210/914;
585/826
[58] Field of Search .................... 55/74; 208/253, 299,
208/305; 210/670, 679, 688, 914; 585/826

[56] References Cited

U.S. PATENT DOCUMENTS 4,094,777  6/1978  Sugier et al. ........................ 210/679
4,909,926  3/1990  Yan ..................................... 208/253

Primary Examiner—Ivars Cintins
Attorney, Agent, or Firm—Alexander J. McKillop; Charles J. Speciale

[57] ABSTRACT

The process relates to on-line rejuvenation of adsorbent beds which are used for removing mercury from mercury contaminated feeds.

20 Claims, 1 Drawing Sheet

ON-LINE REJUVENATION OF SPENT ABSORBENTS

BACKGROUND OF THE INVENTION

The invention relates to rejuvenation of spent adsorbents used in purification of fluids. One object of rejuvenation is to provide a means to rejuvenate the spent adsorbents to extend its cycle life. Another object of the invention is to provide a rejuvenation process which is effective and can be carried out on-line without interrupting the normal operation, i.e., during Hg removal. An additional objective is to provide a rejuvenation process which produces no waste by-products.

Mercury (hereinafter "Hg") in heavy condensate causes marketing, processing, and environmental concerns. A topic of current concern is the removal of Hg from crudes and petroleum feeds. Primary concerns relate to Hg as a contaminant in plant feedstocks, and its effect on plant equipment, as well as means of mitigating the problems.

Typical crude oils contain mercury. Higher levels of mercury are often found in hydrocarbon condensates from natural gas production. Concentrations between fifty and three hundred parts per billion are present in the condensate from some fields.

High levels of mercury in hydrocarbon liquid, crude oil and condensate can cause problems in processing due to the corrosive effect of mercury on vital equipment such as cryogenic heat exchangers. Such heat exchangers are often made from aluminum which forms an amalgam with mercury. In addition, mercury in hydrocarbon products is released into the air upon combustion and causes environmental concerns.

SUMMARY OF THE INVENTION

The invention relates to decreasing mercury contaminant in petroleum crudes, condensates from natural gas waste waters, and gases containing greater than 20 ppb Hg, to e.g., less than 20 ppb, preferably less than 10 ppb. The invention relates to a high temperature chemisorption process for Hg removal. For example, in this process, the condensate from the stabilizer at 400°-500° F. and 220 psi is passed over the adsorbent for Hg removal before heat exchanging and storage.

The invention relates to increasing cycle life of the chemisorption process by increasing the life of the non-regenerative adsorbent so as to eliminate the need of equipment and on-site regeneration. The adsorbents used in accordance with the invention include $Ag/Al_2O_3$, $CuS/Al_2O_3$, $CuS/SiO_2$ and $CuS/C$.

DESCRIPTION OF THE DRAWING

The FIG. 1 is a graph of the plot of the Hg removal (weight percent) vs. bed volume of condensate treated.

DETAILED DESCRIPTION OF THE INVENTION

Figure 1:
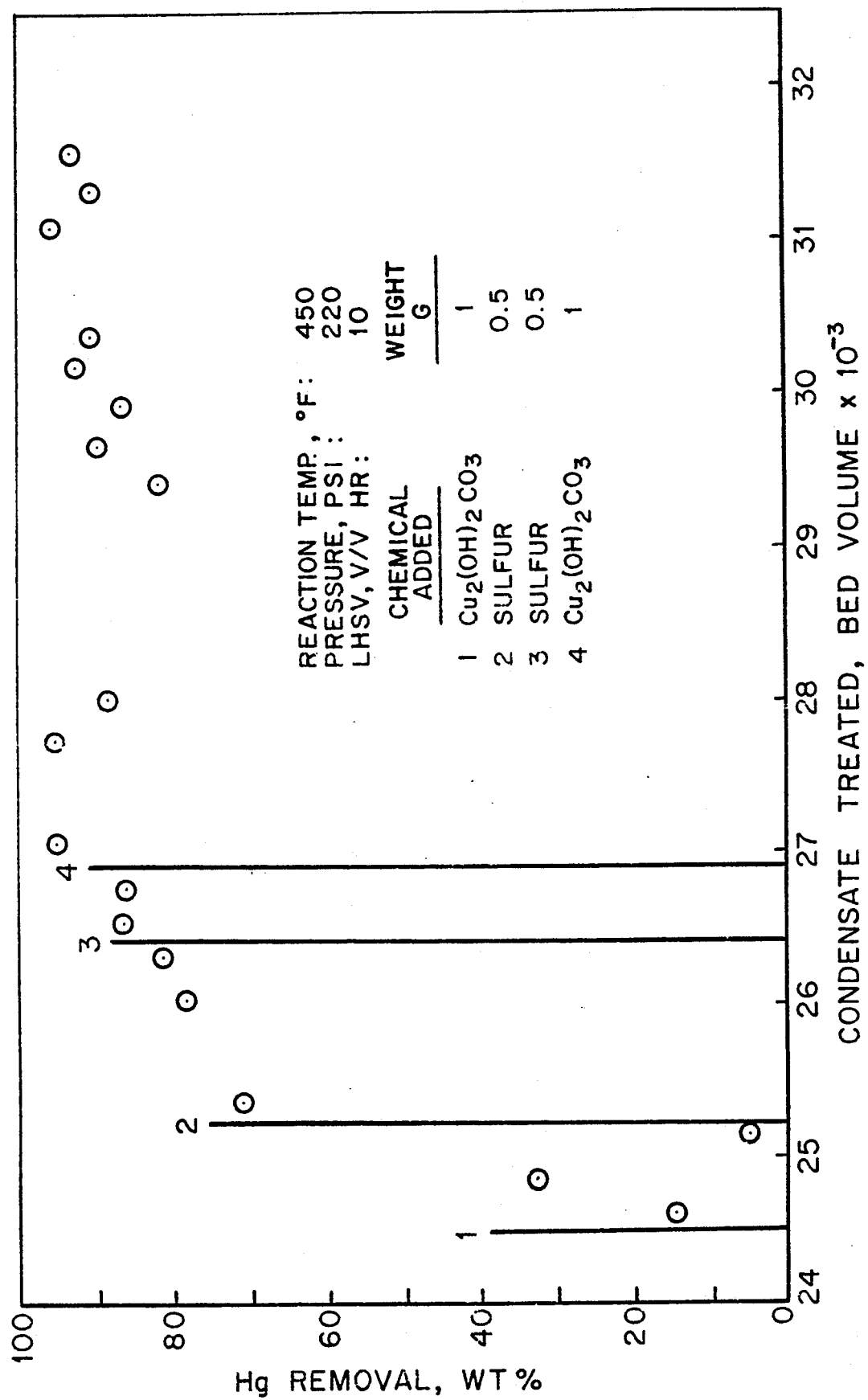

The invention relates to removing deleterious metals, such as Hg, from liquid hydrocarbon feedstocks, waste waters and gases, by chemisorption process which comprises passing the fluid feedstock at ambient and elevated temperatures over an adsorbent. The heavy condensate produced from some gas fields contains about twenty percent of $C_{10}$ and higher hydrocarbons, and five percent of $C_{20}$ and higher hydrocarbons. Typical crudes which often contain mercury are much heavier than the condensate, and can contain up to eighty percent $C_{20}$ and higher hydrocarbons. When adsorbents are used to adsorb mercury directly, the non-selective adsorption of the heavy material competes too favorably with the mercury leading to low mercury adsorption capacity. The invention also relates to increasing the life cycle of the chemisorption process by rejuvenating the adsorbent on-line.

The adsorbent of the invention comprises silver (Ag) or CuS on a support of high surface area. In accordance with the invention the silver or CuS is the component of the adsorbent which reacts with the Hg. The support of high surface area has a surface area ranging from 50 to 1000 $m^2$/gm.; the support is inert to the presence of Hg in the Hg containing feeds treated in accordance with the invention. The support can be $SiO_2$, $Al_2O_3$, silica-alumina and carbon. Preferably, the support is carbon. Most preferably the adsorbent is CuS/C. The amount of silver or CuS on the support can range from 1 to about 30 weight %.

Various methods can be use to ameliorate shortened life cycles in the chemisorption process, due to spent adsorbent. The selectivity of the process for Hg adsorption can be increased. By increasing the adsorption temperature, the selectivity of adsorption for Hg over hydrocarbons is improved.

Alternatively, the concentration of the active components, generally ranging from 1 to 20 percent, e.g. CuS, on the adsorbent, can be increased. Accordingly, the content of the Cu can be increased, to increase Hg sorption selectivity, to a maximum of 25 to about 30 weight percent. With respect to cost and availability, CuS is preferred to Ag in accordance with the invention.

Another alternative for increasing the cycle life based on adsorbent longevity, is to rejuvenate the adsorbent on-line. The chemical nature of the support is not critical to the efficacy of the adsorbents. Accordingly, the spent adsorbent should be an equally good support. Thus, the exhausted adsorbent can be rejuvenated by depositing a new active component, e.g. CuS, on it.

The CuS is insoluble in oil. However, it can be produced and deposited on the exhausted adsorbent by feeding sources of Cu and sources of S alternately into the system. Copper salt, such as copper acetate ($Cu_2(C_2H_3O_2)_2$); copper diamine chloride [$Cu(NH_3)_2Cl_2$ , copper tetraamine nitrate [$Cu(NH_3)_4](NO_3)_2$; copper chloride ($CuCl_2$); copper formate [$Cu(CHO_2)$] and basic copper carbonate $Cu_2(OH)_2CO_3$, is dissolved in water or directly mixed in the feed and passes over the exhausted adsorbent for adsorption. Sulfur dissolved in solvent or in the form of slurry is then pumped over the exhausted adsorbent where active CuS is formed. When the fresh adsorbent is silver, Ag, a water soluble source can be introduced into the system and treated with a water soluble reducing agent, such as formaldehyde, or reduced with hydrogen or decomposed at high temperature. For high temperature decomposition, $Ag(C_2H_3O_2)_2$ is particularly preferred as the Ag source.

Various methods of implementation may be employed. The sparingly soluble copper salt, can be injected into the system and deposited on the spent adsorbent in the form of slurry. The copper salt gradually dissolves into the oil and distributes over the spent adsorbent. Similarly, the sulfur can be injected into the system as a slurry.

Another method for implementing the procedure is to dissolve the copper salt in water first and then injecting as an aqueous solution. Similarly, sulfur can be dissolved in solvents such as $CS_2$ first and then injecting it as a solution.

One preferred sequence of chemical addition for rejuvenating spent adsorbent used in treating aqueous Hg contaminated feeds is first to add a water-soluble copper source, such as $Cu(NO_3)_2$ or $[Cu(NH_3)_4](NO_3)_2$, followed by addition of water soluble sources of sulfur, e.g., polysulfides (such as $Na_2S_x$ or $(NH_4)_2S_x$. The mole ratio of sources(s) of sulfur and of copper is sufficient to provide stoichiometric ratios of one to the other. The quantity of sources of copper and sulfur for this rejuvenation should be controlled so that there will be no breakthrough of copper and/or sulfur. The amount of copper adsorbent provided should range from 1 to 5 weight percent of the adsorbent (based on the combined weight of support, spent adsorbent and fresh active adsorbent).

The system can be based on fixed or moving bed adsorbents in horizontal or vertical reactors. The chemisorption process can be conducted at subatmospheric, atmospheric or superatmopheric pressure. Mercury within the hydrocarbon oil is removed by passing it through a reactor filled with adsorbent. The process can be conducted in vapor, vapor/liquid or liquid phase, but homogeneous liquid or vapor phase is preferred to avoid maldistribution of the feed in the adsorption bed. Liquid phase operation is preferred for processing heavy hydrocarbon condensates. The unit pressure is maintained at a high enough level to ensure liquid phase operation at high temperature. A pressure of at least 100 psi is maintained for the processing of liquid condensate. The process may be carried out in the presence of other gases such as light hydrocarbon carbons ($C_1$-$C_6$), $H_2$, $H_2S$, $N_2$, $H_2O$, $CO_2$ and mixtures thereof. When the Hg containing feed is a condensate (from natural gas production) petroleum refinery feedstock it will be treated at a temperature above 250° F., preferably above 400° F. When the Hg containing fluid is a waste water it will be treated at a temperature of near ambient condition. Gases containing Hg will be treated at ambient temperature.

The optimum treating (reactor) temperature increases with the molecular weight or boiling point of the heaviest portion of the feed. This is because it is this fraction which most successfully competes with mercury for adsorption, thereby destroying the activity of the adsorbent for mercury remove. As described in my U.S. Pat. No. 4,909,946, the preferred reactor temperature range (T) can be determined approximately (within plus or minus 50° F.) by applying the equation:

$$T(°F.) = 0.64(BP) + 100° F.$$

where BP is the 90% boiling point of the feed in degrees Fahrenheit. Pressure is controlled to assure single phase operation, regardless of the feed. For hydrocarbon oils such as heavy condensate or crude oil, liquid phase operation is preferred. For light gases such as $C_1$, $C_2$, $C_3$ and their mixtures, gas phase operation is preferred. The stage of spent adsorbent rejuvenation can be undertaken under identical conditions of temperature and pressure as the Hg removal stage. However, depending on the mode of rejuvenation and the exact fluid, such as a gas, the rejuvenation stage may be undertaken under different conditions of temperature and pressure.

The process will find general applicability where the adsorbent can be produced and deposited on line and where the support for the adsorbent is inert to the material to be removed. The process of the invention eliminates the problems of disposing or regenerating the spend adsorbents.

EXAMPLES

Example 1

The condensate used in this study exhibited the following properties: API gravity, 53°; Saturate, 52.1%; $C_{10}+$, 20%; and $C_{20}+$, 5%. The Hg content in the feed had been determined to be 220 PPb. However, as the bottom of the drum was reached, its Hg content increased up to 557 PPb and varied significantly. As a result, the Hg contents were analyzed frequently (Table 1).

Adsorbent $CuS/Al_2O_3$ is a commercial adsorbent from United Catalysts.

Procedures

A 0.25 inch O.D. stainless steel tube of 0.035 inch wall thickness was packed with 0.25cc of the adsorbent of 18/40 mesh size. The condensate, with and without added Hg, was pumped downflow through the reactor. After 24,600 bed volume of the feed, the Hg adsorption capacity of the adsorbent was nearly exhausted shown in Table 1, the Hg adsorption capacity of the absorbent had decreased to a mercury removal percentage of slightly less than 15% at this point. One gram of basic copper carbonate, $Cu_2(OH)_2CO_3$, was then placed in an on-line cartridge and 500 bed volume of the feed was pumped through to dissolve and distribute the copper salt over the bed. Then 0.5g of sulfur flour was placed in the on-line cartridge and 1,000 bed volume of condensate was pumped through to dissolve and distribute the S over the bed to react with the copper to form active CuS. The procedure was repeated in the reverse order of S and Cu (Table 1 and FIG. 1).

The products during and after this rejuvenation procedure were analyzed for Hg contents. The results are shown in Table I and in FIG. 1.

TABLE I

Rejuvenation of $CuS/Al_2O_3$ for Hg Removal
Feed: Indonesian Condensate*
Temp, °F: 450
LHSV, v/vHr: 10
Press., psi: 220

| Time (Day) | Bed Volume | Hg. PPb Feed | Product | Hg Removal % |
|---|---|---|---|---|
| 0 | Placed 1 g $Cu_2(OH)_2CO_3$ in on-line cartridge. | | | |
| 1 | 24,628 | 557 | 476 | 14.5 |
| 2 | 24,868 | 557 | 353 | 36.6 |
| 3 | 25,108 | 557 | 526 | 5.6 |
| 3 | Placed 0.5 g S in on-line cartridge. | | | |
| 4 | 25,344 | 557 | 155 | 72.2 |
| 7 | 26,064 | 557 | 118 | 78.8 |
| 8 | 26,304 | 520 | 93 | 82.1 |
| 8 | Placed 0.5 g S in on-line cartridge. | | | |
| 9 | 26,544 | 520 | 67 | 87.1 |
| 9 | Placed 1 g $Cu_2(OH)_2CO_3$ in on-line cartridge. | | | |
| 10 | 26,784 | 520 | 63 | 87.9 |
| 11 | 27,024 | 520 | 20 | 96.2 |
| 14 | 27,744 | 151 | 6 | 96.0 |
| 15 | 27,984 | 174 | 19 | 89.1 |
| 21 | 29,424 | 174 | 31 | 82.2 |
| 22 | 29,64 | 174 | 17 | 90.2 |
| 23 | 29,904 | 345 | 44 | 87.2 |
| 24 | 30,144 | 345 | 25 | 92.8 |
| 25 | 30,384 | 345 | 31 | 91.0 |
| 28 | 31,104 | 345 | 14 | 95.9 |
| 29 | 31,344 | 276 | 24 | 91.3 |

TABLE I-continued

Rejuvenation of CuS/Al₂O₃ for Hg Removal
Feed: Indonesian Condensate*
Temp, °F: 450
LHSV, v/vHr: 10
Press., psi: 220

| Time (Day) | Bed Volume | Hg, PPb Feed | Hg, PPb Product | Hg Removal % |
|---|---|---|---|---|
| 30 | 31,584 | 276 | 20 | 92.8 |

*The condensate is liquid product from gas field oil with a boiling point ranging for C₅+ to about 650° F.

The spent CuS/Al₂O₃ adsorbent was effectively rejuvenated by depositing new active CuS on top of it. The Hg removal was increased from about 20 to 90% by this rejuvenation procedure (FIG. 1). The rejuvenation procedure of the present invention is suitable after the Hg adsorption capacity of the adsorbent has decreased. The activity of the rejuvenated adsorbent was close to that of the fresh adsorbent and the Hg in the product was reduced to 20 PPb in spite of the high feed Hg contents Table 1).

In principle, the rejuvenation procedure can be repeated to extend the ultimate life of the adsorbent until other physical limitations, such as bed plugging, set in.

In the CuS/Al₂O₃ tested, the prime active component for Hg removal appears to be CuS. When Cu salt alone was added, the spent adsorbent remained inactive. However, it became active as soon as the sulfur was added. Additional sulfur seems to improve the Hg removal only slightly. However, when it was followed with more Cu salt, some additional improvement in Hg removal resulted (FIG. 1). These results suggest that CuS is the reactive component of the adsorbent.

What is claimed is:

1. A process for removing Hg from a Hg contaminated feed selected from the group consisting of petroleum refinery feed stock, waste waters and gases, with an adsorbent which, on being spent, can be rejuvenated on-line comprising:
    contacting the Hg contaminated feed with an adsorbent which comprises an amount of CuS or Ag and a support which has a surface area ranging from 50 to 1000 m²/gm. and is inert to the presence of Hg in the Hg containing feed,
    wherein the amount of CuS or Ag ranges from 1 to 30 weight percent of the said absorbent, wherein contacting is undertaken at a temperature of at least ambient and at a pressure ranging from subatmospheric to superatmospheric;
    removing Hg from said contaminated feed; continuously contacting said Hg contaminated feed with said adsorbent and thereby causing the adsorbent to be spent;
    rejuvenating said adsorbent, after the Hg adsorption capacity of said adsorbent has decreased by depositing additional CuS or Ag on said spent adsorbent by the steps of:
        contacting the spent adsorbent with a source of copper or silver;
        providing a precipitating reagent selected from the group consisting of a source of sulfur or a reducing agent;
        contacting the source of copper or silver with said precipitating reagent to precipitate CuS or Ag on the spent absorbent; and
        passing additional Hg contaminated feed to contact it with the precipitated Cus or Ag on said spent absorbent.

2. The process of claim 1, which includes dissolving Cu₂(OH)₂CO₃ in water and feeding it to the spent adsorbent as a solution.

3. The process of claim 2, wherein the source of copper is contacted with the spent adsorbent prior to providing said precipitating reagent.

4. The process of claim 1, wherein the source of copper or silver is mixed directly with the feed.

5. The process of claim 1, wherein the source of copper or silver is contacted with the spent adsorbent prior to providing said precipitating reagent.

6. The process of claim 1, wherein the precipitate is provided in an amount ranging from 1 to 30 weight percent of the combined weight of the precipitate, the adsorbent and said bed.

7. The process of claim 1, wherein the source of copper is selected from the group consisting of copper acetate (Cu₂(C₂H₃O₂)₂); copper diamine chloride [Cu(NH₃)₂Cl₂], copper tetraamine nitrate [Cu(NH₃)₄]-(NO₃)₂; copper chloride (CuCl₂); copper formate [Cu(CHO₂)] and basic copper carbonate Cu₂(OH)₂CO₃.

8. The process of claim 7, wherein the precipitating agent is selected from the group consisting of Na₂S$_x$, (NH₄)₂S$_x$ and admixtures thereof.

9. The process of claim 1, wherein the precipitating agent is selected from the group consisting of Na₂S$_x$, (NH₄)₂S$_x$ and admixtures thereof.

10. The process of claim 1, wherein the source of sulfur is a water insoluble source of sulfur.

11. The process of claim 1, wherein the reducing agent is hydrogen.

12. The process of claim 1, wherein the temperature of contacting the Hg contaminated feed with adsorbent is $$T(°F.) = 0.64(BP) + 100° F.$$

where BP is the 90% boiling point of the feed in degrees Fahrenheit.

13. The process of claim 12, wherein the pressure is controlled to assure that the Hg contaminated feed is in a single phase.

14. A process for removing Hg from a Hg contaminated feed selected from the group consisting of petroleum refinery feed stock, waste waters and gases, with an adsorbent which, on being spent, can be rejuvenated on-line comprising:
    contacting the Hg contaminated feed with an adsorbent which comprises an amount of Ag and a support which has a surface area ranging from 50 to 1000 m²/gm. and is inert to the presence of Hg in the Hg containing feed,
    wherein the amount of Ag ranges from 1 to 30 weight percent of the said adsorbent, wherein contacting is undertaken at a temperature of at least ambient and at a pressure ranging from subatmospheric to superatmospheric;
    removing Hg from said contaminated feed; continuously contacting said Hg containing feed with said adsorbent;
    depositing additional Ag on said spent absorbent to rejuvenate said adsorbent during said Hg removal by the steps of:
        contacting the spent adsorbent with a source of silver which can be reduced to the elemental state; reducing the source of Ag to provide elemental silver on said spent absorbent; and feeding Hg contaminated feed to contact it with the reduced Ag on said spent adsorbent.

15. The process of claim 14, wherein the elemental silver is provided in an amount ranging from 1 to 30 weight percent of the combined weight of the silver and said spent adsorbent.

16. The process of claim 14, wherein hydrogen is used to reduce the source of silver.

17. The process of claim 14, wherein the temperature of contacting the Hg contaminated feed with adsorbent is $$T(°F.) = 0.64(BP) + 100° F.$$

where BP is the 90% boiling point of the feed in degrees Fahrenheit.

18. The process of claim 17, wherein the pressure is controlled to assure that the Hg contaminated feed is in a single phase.

19. The process of claim 14, wherein the source of silver is provided as a heat decomposable silver compound and is subjected to heat to form the silver.

20. The process of claim 14 wherein formaldehyde is used to reduce the source of silver to elemental silver.

* * * * *